US008498283B2

(12) United States Patent
Brunel et al.

(10) Patent No.: US 8,498,283 B2
(45) Date of Patent: Jul. 30, 2013

(54) METHOD FOR TRANSFERRING A SEQUENCE ENABLING THE IDENTIFICATION OF THE HOME BASE STATION BY A MOBILE TERMINAL FOR AVOIDING THE USE OF SAME PSC/PCID SEQUENCE B HOME BASE STATIONS

(75) Inventors: Loic Brunel, Rennes Cedex (FR); Mourad Khanfouci, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 282 days.

(21) Appl. No.: 12/844,458

(22) Filed: Jul. 27, 2010

(65) Prior Publication Data
US 2011/0039565 A1    Feb. 17, 2011

(30) Foreign Application Priority Data
Aug. 13, 2009    (EP) .................................. 09010473

(51) Int. Cl.
*H04W 74/04* (2009.01)
(52) U.S. Cl.
USPC ........... 370/345; 370/331; 370/349; 370/350; 370/338; 370/332; 455/436; 455/561; 455/67.11; 455/420; 455/422.1
(58) Field of Classification Search
USPC ................ 455/432.1–453, 456.1–457, 550.1, 455/561, 500, 404.2, 422.1, 67.1, 67.2, 67.3, 455/67.11, 67.13, 423, 420, 439, 524, 562.1; 370/328, 331, 332, 341, 353, 338, 230–235, 370/324, 345–350, 237, 342, 343, 498, 389, 370/392, 400, 401, 508, 516, 335–336
See application file for complete search history.

(56) References Cited

U.S. PATENT DOCUMENTS

| | | | |
|---|---|---|---|
| 2006/0133309 A1* | 6/2006 | Mathis et al. | ................. 370/328 |
| 2007/0253465 A1 | 11/2007 | Muharemovic et al. | |
| 2009/0323590 A1* | 12/2009 | Fujimoto | ...................... 370/328 |
| 2012/0156990 A1* | 6/2012 | Dateki et al. | ................... 455/39 |

FOREIGN PATENT DOCUMENTS

| | | |
|---|---|---|
| EP | 2 079 249 A1 | 7/2009 |
| WO | WO 2009/022303 A1 | 2/2009 |

* cited by examiner

*Primary Examiner* — Vladimir Magloire
*Assistant Examiner* — Babar Sarwar
(74) *Attorney, Agent, or Firm* — Oblon, Spivak, McClelland, Maier & Neustadt, L.L.P.

(57) ABSTRACT

The present invention concerns a method for transferring in a wireless cellular telecommunication network, a sequence enabling the identification, by a mobile terminal, of the home base station, the symbols transferred between the home base station and the mobile terminal being separated by a guard period. The home base station:
  receives from at least one neighboring home base station a sequence enabling the identification of the neighboring base station,
  selects one received sequence,
  shifts the start of the transfer of a frame of symbols in the cell of the home base station from a start of the reception of a frame of symbols that may be transferred by the neighboring home base station which may be identified with the selected received sequence by a time duration which is at least equal to the guard period, the frame of symbols comprising the selected sequence.

13 Claims, 7 Drawing Sheets

| | SF10' | | SF1 | | ---------- | SF6 | | ------ | SF10 | |
|---|---|---|---|---|---|---|---|---|---|---|
| 25 | | | | | | | | | | |
| 24 | | | | | | | | | | |
| ⋮ | | | SSC | | | SSC | | | | |
| | | | | | | | | | | |
| | | | | | | | | | | |
| | | | PRBx | | | | | | | |
| | | | | | | | | | | |
| | | | | | | | | | | |
| | | | | | | | | | | |
| ⋮ | | | PSC | | | PSC | | ------ | | |
| 3 | | | | | | | | | | |
| 2 | | | | | | | | | | |
| 1 | PRBa | PRBb | PRBa | PRBb | ---------- | PRBa | PRBb | PRBb | PRBa | PRBb |

Fig. 5a

METHOD FOR TRANSFERRING A SEQUENCE ENABLING THE IDENTIFICATION OF THE HOME BASE STATION BY A MOBILE TERMINAL FOR AVOIDING THE USE OF SAME PSC/PCID SEQUENCE B HOME BASE STATIONS

The present invention relates generally to a method and a device for transferring, in a wireless cellular telecommunication network, a sequence enabling the identification of a home base station by a mobile terminal located in the cell of the home base station.

Wireless cellular telecommunication networks are largely deployed but there are still some areas not covered by the base stations of the wireless cellular telecommunication network.

For example, the access to the wireless cellular telecommunication network might not be possible for a mobile terminal located in a building, if the signals radiated by the base stations are too attenuated.

Solutions are proposed today. Particular base stations, like home base stations or femto base stations, provide coverage areas within the buildings.

The home base stations or femto base stations provide a limited coverage area.

Home base stations may enable a limited number of mobile terminals to access the wireless cellular telecommunication network through their respective resources.

Each home base station or base station has a physical cell identity (PCID) for its cell which characterises the home base station HBS in the physical layer.

It has to be noted here that if the cell of the home base station is composed of plural sectors, the home base station has as many PCID as sectors.

For example, the PCID is composed of two sequences, a first sequence named PSC sequence is transferred in the Primary Synchronisation Channel (PSC) and a second sequence named SSC is transferred in the Secondary Synchronisation Channel (SSC).

For example, three PSC sequences are available in the wireless cellular telecommunication network, each having good time auto-correlation properties.

For example, hundred sixty eight SSC sequences are available in the wireless cellular telecommunication network, each having good time auto-correlation properties.

According to the aforementioned example, the total number of PCIDs is then equal to five hundred and four.

The three PSC sequences are quasi-orthogonal in order to ensure efficient time synchronisation for three different synchronised cells.

For example, the PSC sequence may be used for channel estimation enabling coherent detection of the SSC sequence.

As the cells cover small areas and as a lot of home base stations may be located in a same area, PSC sequences are received synchronously by the mobile terminal. If the same PSC sequence is used by at least two home base stations, the mobile terminal may receive a combination of PSC sequences which might be destructive.

If the same sequence is used for plural sectors or cells located in an overlapping area, the mobile terminal which is located in the overlapping area estimates from the PSC sequence a non-existing channel corresponding to the sum of plural channels, which will strongly degrade the detection of the SSC sequence.

If a same PSC sequence is used by two neighbouring home base stations or a home base station and a base station which are neighbours, the mobile terminal channel estimation through PSC and SSC sequences is strongly degraded.

Having the same PSC sequence in two neighbouring cells is very likely, since the number of sequences is limited.

Furthermore, if two neighbouring home base stations or a home base station and a base station which are neighbours have the same PCID, the channel estimation through reference signals (RS), also named pilot symbols or pilot signals, is strongly degraded and it might be impossible for a mobile terminal to perform reliable measurements and to read the global cell identities (GCIDs) of the corresponding cells.

A GCID uniquely identifies a home base station or a base station.

In order to enable handover from a home base station to another, the mobile terminal performs some measurements on RS of neighbouring cells.

The mobile terminal performs synchronisation on a neighbouring cell and then measures for instance the received power of the reference signals of this neighbouring cell. The reference signal sequence and its location within time/frequency domains depend on the PCID of the home base station which manages this neighbouring cell. After measurement over a given time period, the mobile terminal sends a report to the home base station currently serving the mobile terminal containing the measurement value and the corresponding PCID.

A home base station is serving a mobile terminal when the mobile terminal can establish or continue a communication with a remote telecommunication device through the resource of the home base station.

If several home base stations or base stations have the same PCID and are in the neighbourhood of the home base station serving the mobile terminal, the home base station serving the mobile terminal cannot associate a measurement to a home base station or base station.

The home base station which serves the mobile terminal MT must then ask the mobile terminal to read the GCID of the neighbouring home base station or neighbouring base station, which takes more time than obtaining the PCID.

A home base station can sound its environment through mobile terminals by asking them to read and report the GCID corresponding to a given PCID.

Based on these reports, the home base station can build its neighbour list containing PCID-GCID relationships.

Furthermore, a home base station can determine its PCID on its own based on a list of PCIDs sent by the network and restricted by removing PCIDs identified into mobile terminals reports or by removing PCIDS acquired using a downlink receiver which is included into the home base station.

Due to the small coverage of cells of home base stations, whose radius is in the order of tens of meters, the propagation time between neighbour home base stations is less than one micro second.

The propagation time is less than a predetermined time duration.

The time duration may be a symbol duration or a multiple number of symbol durations or a guard period duration or a multiple number of guard period durations or, when the symbols are Orthogonal Frequency Division Multiplexing (OFDM) symbols, the time duration may be an OFDM cyclic prefix named also guard period.

Thus, if home base stations send signals in a synchronous manner, the signals are received also synchronously at the mobile terminals, the different propagation delays being perceived as multipath propagation delay.

The present invention aims at avoiding that a same PSC sequence or a same PCID is used by two home base stations the cells of which overlap each other, in a way that hinders synchronisation, channel estimation and communication.

To that end, the present invention concerns a method for transferring in a wireless cellular telecommunication network, a sequence enabling the identification, by a mobile terminal located in a cell of a home base station, of the home base station, the symbols transferred between the home base station and the mobile terminal being separated by a guard period, characterised in that the method comprises the steps, executed by the home base station of:

receiving from at least one neighbouring base station or at least one neighbouring home base station a sequence enabling the identification of the neighbouring base station or the neighbouring home base station, selecting one received sequence enabling the identification of one neighbouring base station or neighbouring home base station, shifting the start of the transfer of a frame of symbols in the cell of the home base station from a start of the reception of a frame of symbols that may be transferred by the neighbouring base station or neighbouring home base station which may be identified with the selected received sequence by a time duration which is at least equal to the guard period, the frame of symbols comprising the selected sequence enabling the identification of the neighbouring base station or neighbouring home base station.

The present invention concerns also a device for transferring in a wireless cellular telecommunication network, a sequence enabling the identification of a home base station by a mobile terminal located in the cell of the home base station, the symbols transferred between the home base station and the mobile terminal being separated by a guard period, characterised in that the device is included in the home base station and comprises:

means for receiving from at least one neighbouring base station or at least one neighbouring home base station a sequence enabling the identification of the neighbouring base station or the neighbouring home base station, means for selecting one received sequence enabling the identification of one neighbouring base station or neighbouring home base station, means for shifting the start of the transfer of a frame of symbols in the cell of the home base station from a start of the reception of a frame of symbols that may be transferred by the neighbouring base station or neighbouring home base station which may be identified with the selected received sequence by a time duration which is at least equal to the guard period, the frame of symbols comprising the selected sequence enabling the identification of the neighbouring base station or neighbouring home base station.

Thus, two same sequences enabling the identification of two different neighbouring home base stations or of a neighbouring home base station and a neighbouring base station will not be received synchronously at a mobile terminal.

The mobile terminal is then able to distinguish correctly two different home base stations or a base station and a home base station, to perform the correct synchronization to improve the channel estimation.

Indeed, not determining that a same sequence comes from two distinct neighbouring home base stations or a neighbouring home base station and a neighbouring base station may degrade further synchronisation and channel estimation steps, for instance if the sequence is also used for channel estimation. In this case, the sum of the channels of the two home base stations or a home base station and a base station will be estimated, which will degrade the performance of the receiver.

If the mobile terminal receives the same sequence from two distinct neighbouring home base stations or a neighbouring home base station and a neighbouring base station with a delay larger than the guard period, it is easy for the mobile terminal to figure out that this delay is not due to multi-path propagation but related to two distinct neighbouring home base stations or a neighbouring home base station and a neighbouring base station.

A larger time duration guarantees more robustness against channels with larger delay spread and environments with larger propagation delays.

According to a particular feature, each sequence enabling the identification of one neighbouring base station or neighbouring home base station is a combination of a first and a second sequences comprised in frames, each frame being composed of sub-frames, the selected received sequence being the first sequence and the method comprising further step of detecting each second sequence identifying a neighbouring base station or a neighbouring home base station which may be identified with the selected received sequence and which may transfer a frame of symbols which starts to be received at the same time or at a multiple number of sub-frame durations from the start of the transfer of a frame of symbols by the neighbouring base station or neighbouring home base station.

Thus, as the number of first sequences in the wireless cellular telecommunication network is small, it is easy to identify each first sequence. By detecting the second sequence, it is avoided that two home base stations or a home base station and a base station may be wrongly identified.

According to a particular feature, the home base station selects one non detected second sequence if there is at least one second sequence in the wireless cellular telecommunication network which is not detected, and selects another first received sequence if each second sequence in the wireless cellular telecommunication network is detected.

Thus, a mobile terminal will not receive, as far as possible, overlapping sequences from two home base stations or a base station and a home base station having the same sequence.

According to a particular feature, the home base station determines plural time durations for shifting the start of the transfer of a frame of symbols in the cell of the home base station and another first received sequence is selected if, for each time duration, each second sequence in the wireless cellular telecommunication network is detected.

Thus, more timing possibilities for each sequence enabling the identification of one neighbouring base station or one neighbouring home base station are tested with the present invention.

According to a particular feature, the home base station:
checks if there is at least one sequence enabling the identification of one base station or home base station in the wireless cellular telecommunication network which is not detected, selects one non detected sequence enabling the identification of one base station or home base station if there is at least one sequence enabling the identification of one base station or home base station in the wireless cellular telecommunication network which is not detected, starts to transfer a frame of symbols in the cell of the home base station at the start of the reception of a frame of symbols that may be transferred by at least one neighbouring base station or neighbouring home base station.

Thus, if a first sequence is not used in the neighbourhood, the home base station can use it, avoiding for a mobile terminal to receive several first sequences from several different home base stations or from a home base station and a base station and to have to distinguish them.

Furthermore, synchronising the first sequences of several home base stations or a home base station and a base station allows for more organised timings, maximising the number of sequence enabling the identification of one base station or one home base station opportunities.

According to a particular feature, the time duration is different from a sub-frame duration or a multiple number of sub-frame durations.

Thus, if a mobile terminal receives the same sequence enabling the identification of one base station or one home base station for two different home base stations or a base station and a home base station, it does not receive overlapped symbols like pilot symbols from these home base stations or this home base station and this base station.

According to a particular feature, the time duration is a symbol duration or a multiple number of symbol durations or a guard period duration or a multiple number of guard period durations.

Thus, a mobile terminal receives, as far as possible, first and second sequences from different home base stations or from a base station and a home base station which are not overlapping in time, if the determined time duration is a symbol duration or a multiple number of symbol durations.

The probability that a sequence only overlaps data is then maximised. The sequence detection and power measurement of the sequence can be improved by time averaging, which will decrease the effect of interference from data.

If the time duration is a guard period duration or a multiple number of guard period durations, the number of home base stations and base stations in a same neighbourhood using the same sequence is maximised.

According to a particular feature, pilot symbols are transferred in sub-frames and the time duration is determined so as to avoid that the first and second sequences overlap pilot symbols transferred by a neighbouring home base station or neighbouring base station or overlap first or second sequence transferred by a neighbouring home base station or neighbouring base station or so as to avoid that pilot symbols transferred by the home base station overlap pilot symbols transferred by a neighbouring home base station or neighbouring base station or overlap first or second sequence transferred by a neighbouring home base station or neighbouring base station.

Thus, a mobile terminal receives, as far as possible, the first sequence, the second sequence and pilot symbols from a home base station or a base station which are not overlapping in time with the first sequence, the second sequence and pilot symbols of a neighbouring home base station or of a neighbouring base station.

The probability that a first sequence only overlaps data, a second sequence only overlaps data and pilot symbols only overlap data is then improved.

The first sequence detection, the second sequence detection and channel estimation through pilot symbols can be improved by time averaging, which will decrease the effect of interference from data.

The present invention concerns also a method for determining, by a mobile terminal, in a wireless cellular telecommunication network, if one or more home base stations or one or more base stations or one or more base stations and one or more home base stations transfer a sequence enabling the identification of one base station or home base station, the mobile terminal being located in a cell of base station or home base station, the symbols transferred between the mobile terminal and the base station or home base station being separated by a guard period, characterised in that the method comprises the steps, executed by the mobile terminal of:
- detecting two times a sequence enabling the identification of a base station or a home base station,
- checking if the time duration separating the two receptions of the sequence is larger than the guard period,
- determining that two home base stations or two base stations or a base station and a home base station are identified by the received sequence if the time duration separating the two receptions of the sequence is larger than the guard period,
- determining that a single base station or home base station is identified by the received sequence if the time duration separating the two receptions of the sequence is lower than the guard period.

The present invention concerns also a device for determining, in a wireless cellular telecommunication network, if one or more home base stations or one or more base stations or one or more base stations and one or more home base station transfer a sequence enabling the identification of one base station or home base station, the device being included in a mobile terminal located in a cell of base station or home base station, the symbols transferred between the mobile terminal and the base station or home base station being separated by a guard period, characterised in that the device comprises:
- means for detecting two times a sequence enabling the identification of a base station or a home base station,
- means for checking if the time duration separating the two receptions of the sequence is larger than the guard period,
- means for determining that two home base stations or two base stations or a base station and a home base station are identified by the received sequence if the time duration separating the two receptions of the sequence is larger than the guard period,
- means for determining that a single base station or home base station is identified by the received sequence if the time duration separating the two receptions of the sequence is lower than the guard period.

Thus, the mobile terminal is able to distinguish if it receives a same sequence from two different home base stations or from a home base station and a base station. The mobile terminal can apply proper synchronization, channel estimation and reporting based on this knowledge.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and apparatus according to the invention, they will not be repeated here.

The characteristics of the invention will emerge more clearly from a reading of the following description of an example of embodiment, the said description being produced with reference to the accompanying drawings, among which:

Figure 4:
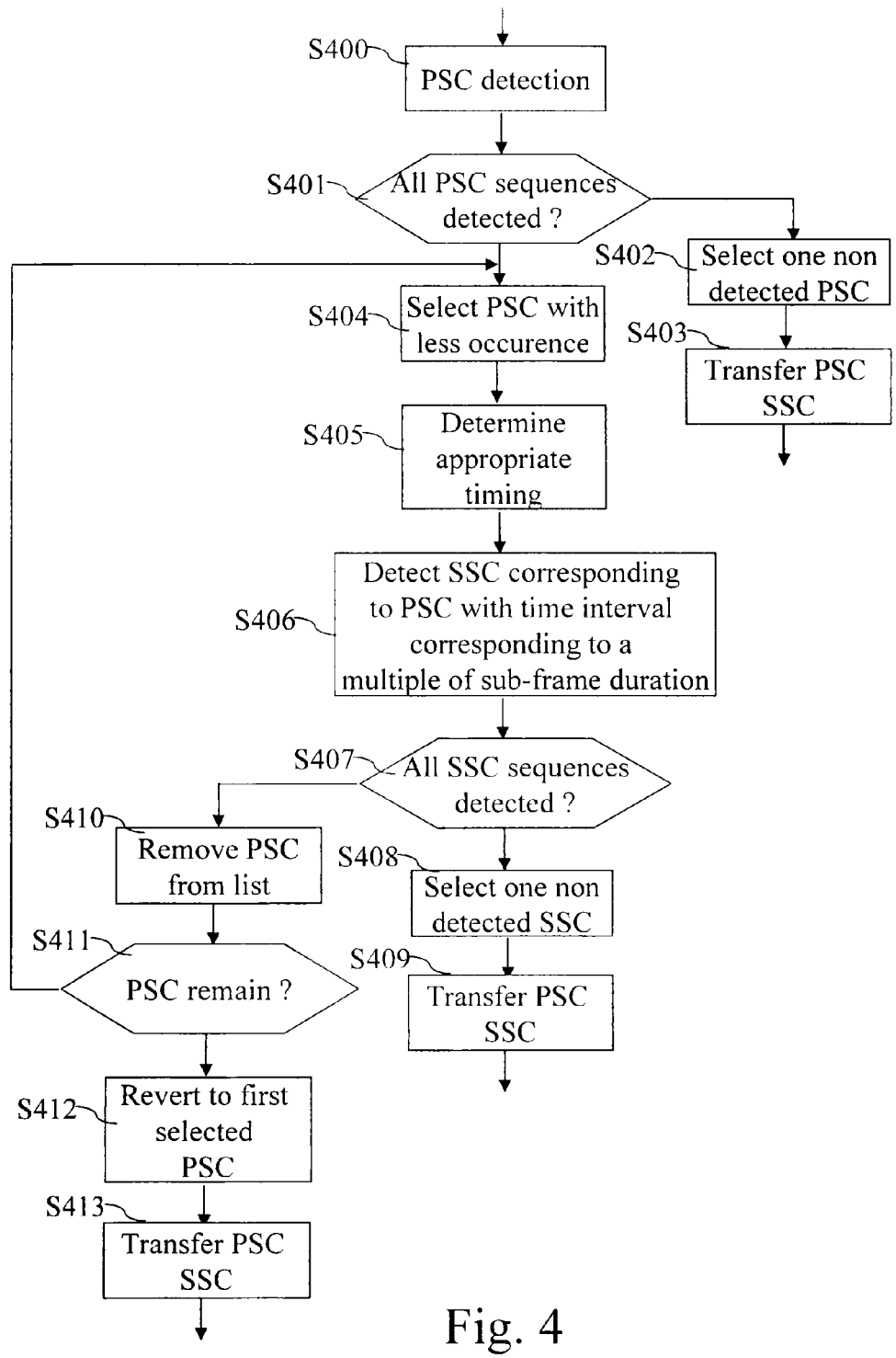
Figures 5B, 8:
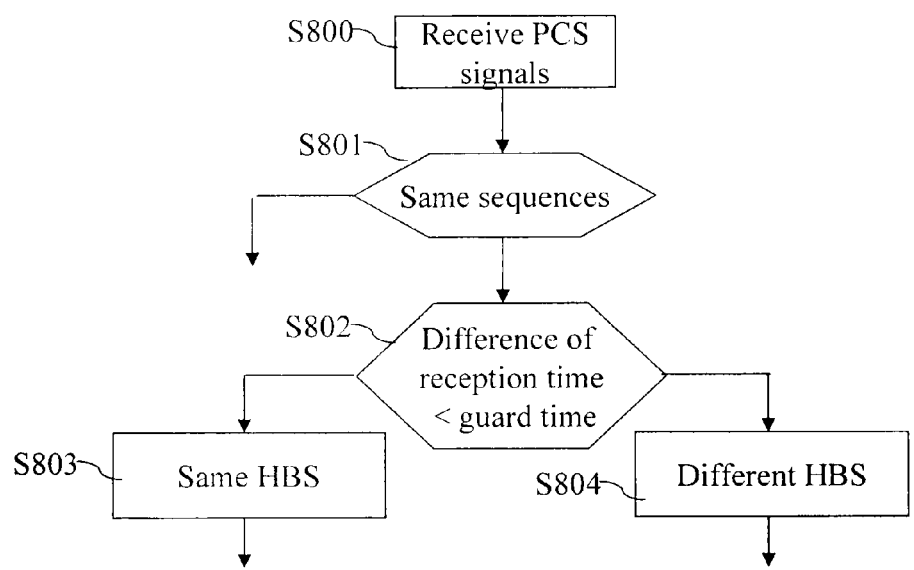
Figure 6:
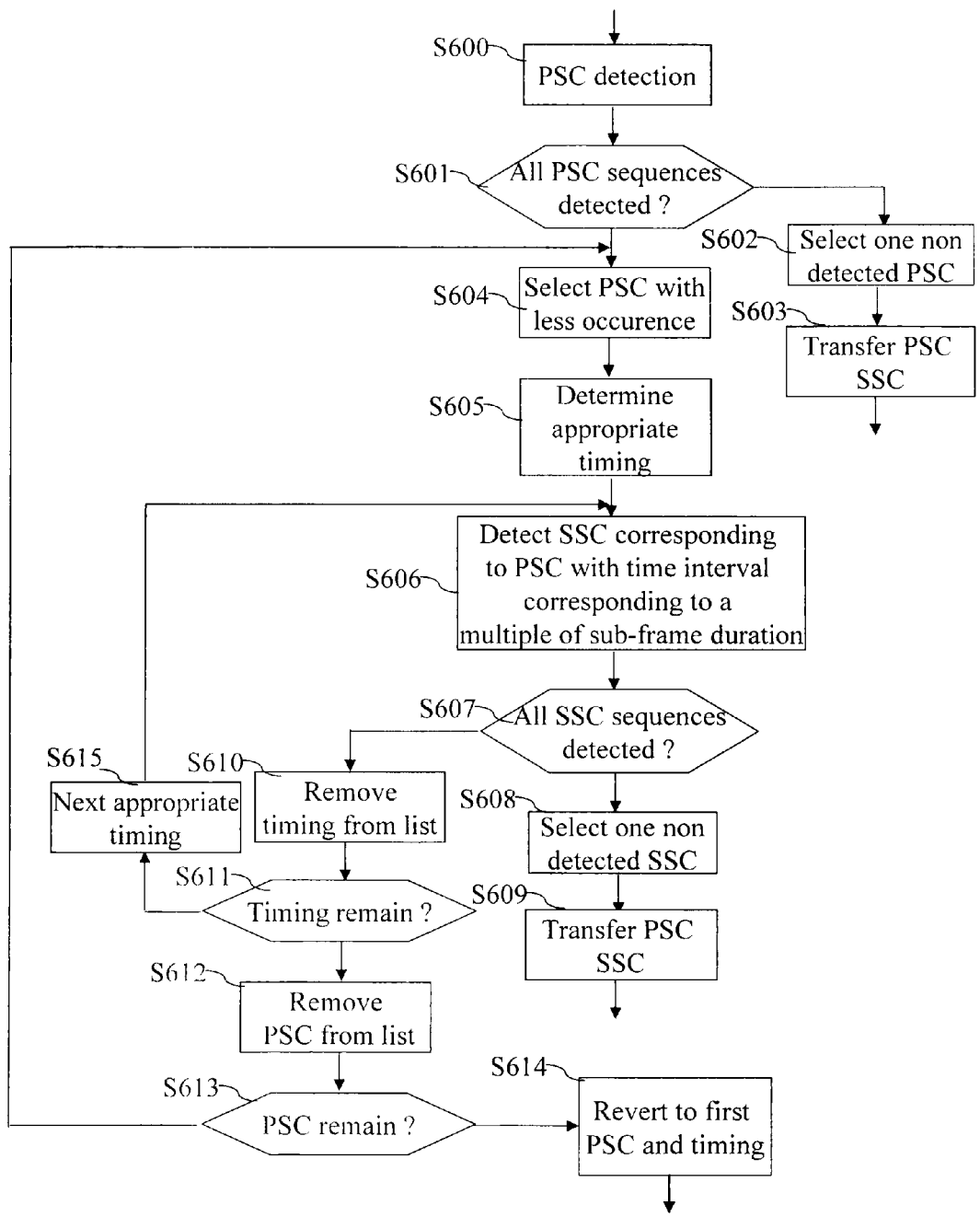
Figure 7:
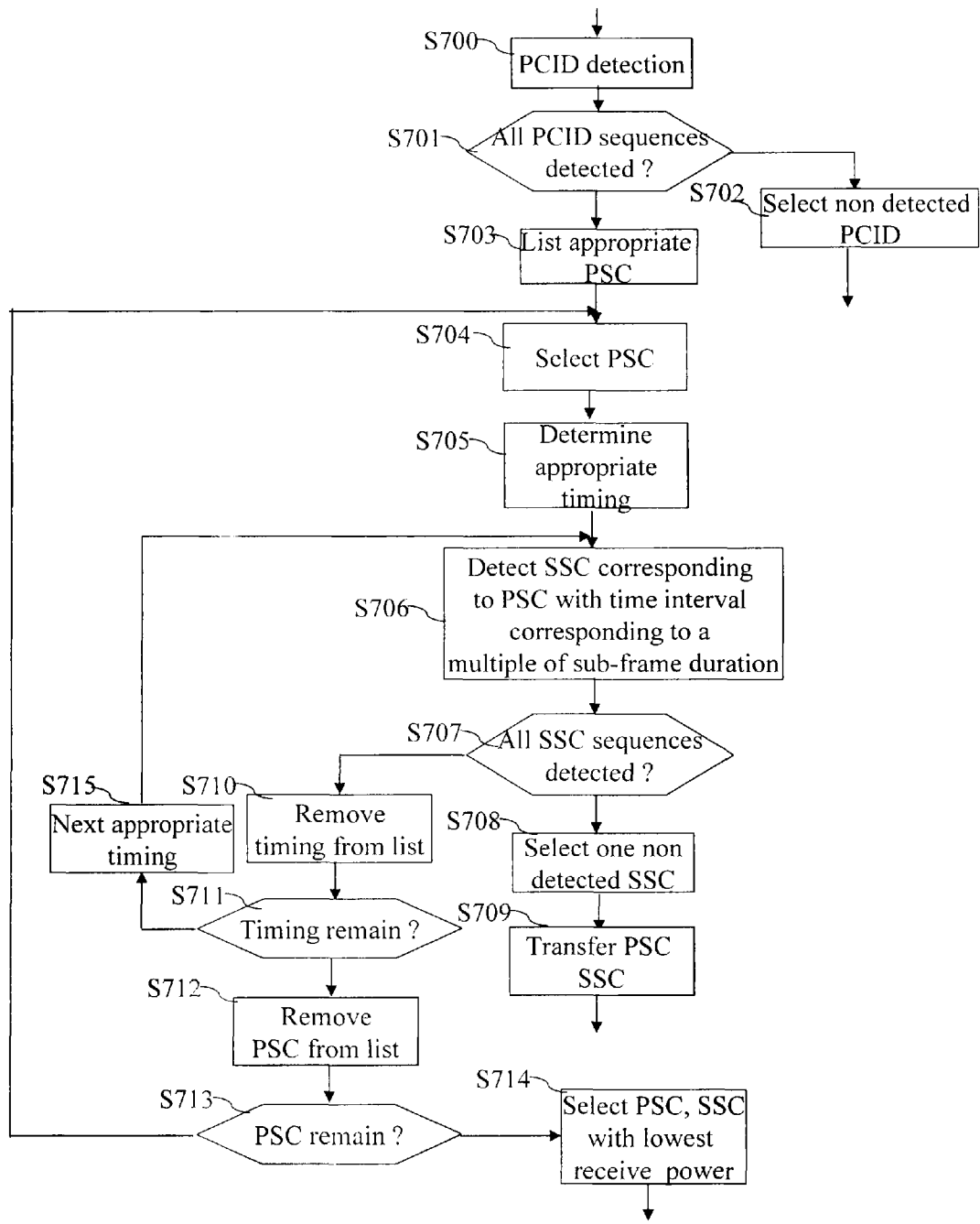

FIG. 4 discloses an example of an algorithm executed by a home base station according to a first mode of realisation of the present invention;

FIG. 5a discloses an example of a frame in the wireless cellular telecommunication network;

FIG. 5b discloses an example of a two consecutive physical resource blocks of the wireless cellular telecommunication network;

FIG. 6 discloses an example of an algorithm executed by a home base station according to a second mode of realisation of the present invention;

FIG. 7 discloses an example of an algorithm executed by a home base station according to a third mode of realisation of the present invention;

FIG. 8 discloses an example of an algorithm executed by a mobile terminal according to the present invention.

Figure 1:
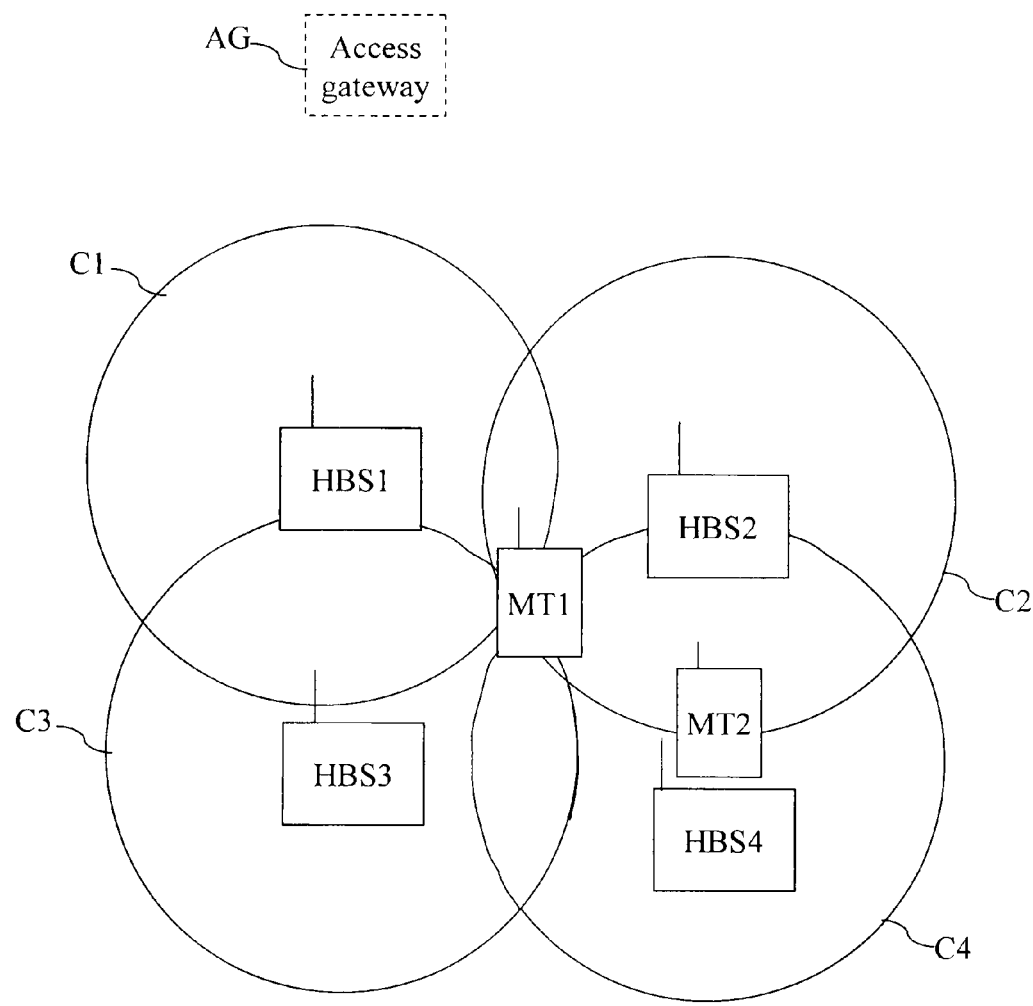
FIG. 1 represents a wireless cellular telecommunication network in which the present invention is implemented.

FIG. 1 represents a wireless cellular telecommunication network in which the present invention is implemented.

In FIG. 1, four home base stations HBS of a wireless cellular telecommunication network and two mobile terminals MT1 and MT2 are shown.

Only four home base stations HBS and two mobile terminals MT1 and MT2 are shown but we can understand that the present invention works when a more important number of home base stations BS and/or a more important number of mobile terminals MT exist.

The home base stations HBS are for example located at home and may enable mobile terminals MT associated to the home base station HBS to access the wireless cellular telecommunication network.

The home base station HBSi with i=1 to 4 is able to receive signals transferred by mobile terminals MT which are located in the area Ci. The home base station HBSi transfers signals which can be received and processed by mobile terminals MT located in the area Ci. The area Ci is the coverage area or the cell of the home base station HBSi.

The mobile terminal MT1 is located in the cell C1 of home base station HBS1, in the cell C2 of home base station HBS2, in the cell C3 of home base station HBS3 and in the cell C4 of home base station HBS4.

The mobile terminal MT2 is located in the cell C2 of home base station HBS2 and in the cell C4 of home base station HBS4.

An access gateway AG may be included in the wireless cellular telecommunication network. The access gateway AG may control the home base station HBS and may interface the home base stations HBS with the rest of the wireless cellular telecommunication network.

It has to be noted here that at least one home base station HBS may be replaced by a base station having a cell covering a more important area.

According to the invention, each home base station:
receives at least one PSC sequence enabling the identification of a neighbouring base station or neighbouring home base station,
selects one received sequence PSC enabling the identification of one neighbouring base station or neighbouring home base station,
shifts the start of the transfer of a frame of symbols in the cell of the home base station from a start of the reception of a frame of symbols that may be transferred by a neighbouring base station or neighbouring home base station which may be identified with the selected received sequence by a time duration which is at least equal to the guard period.

Each mobile terminal MT:
detects two times a sequence enabling the identification of a base station or a home base station,
checks if the time duration separating the two receptions of the sequence is at least larger than the guard period,
determines that two home base stations or a base station and a home base station are identified by the received sequence if the time duration separating the two receptions of the sequence is larger than the guard period,
determines that a single neighbouring base station or neighbouring home base station is identified by the received sequence if the time duration separating the two receptions of the sequence is lower than the guard period.

Figure 2:
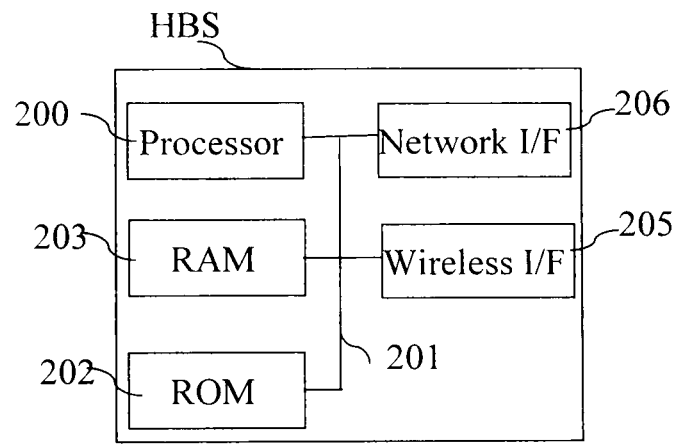
FIG. 2 is a diagram representing the architecture of a home base station in which the present invention is implemented.

FIG. 2 is a diagram representing the architecture of a home base station in which the present invention is implemented.

The home base station HBS has, for example, an architecture based on components connected together by a bus 201 and a processor 200 controlled by the programs as disclosed in FIGS. 4, 6 and 7.

The bus 201 links the processor 200 to a read only memory ROM 202, a random access memory RAM 203, a wireless interface 205 and a network interface 206.

The memory 203 contains registers intended to receive variables and the instructions of the program related to the algorithms as disclosed in FIGS. 4, 6 and 7.

The processor 200 controls the operation of the network interface 206 and of the wireless interface 205.

The read only memory 202 contains instructions of the program related to the algorithms as disclosed in FIGS. 4, 6 and 7, which are transferred, when the home base station HBS is powered on, to the random access memory 203.

The home base station HBS may be connected to a telecommunication network through the network interface 206. For example, the network interface 206 is a DSL (Digital Subscriber Line) modem, or an ISDN (Integrated Services Digital Network) interface, etc.

Through the network interface 206, the home base station HBS may transfer messages to other home base stations or to base stations BS of the wireless cellular telecommunication network or to core devices of the wireless cellular telecommunication network or to the access gateway AG.

The wireless interface 205 and the network interface 206 are the resources of the home base station HBS used by a mobile terminal MT in order to access the wireless cellular telecommunication network when the mobile terminal MT establishes or receives a communication with a remote telecommunication device.

The wireless interface 205 comprises a downlink transmission module and an uplink reception module. The wireless interface 205 may comprise also a downlink reception module.

Figure 3:
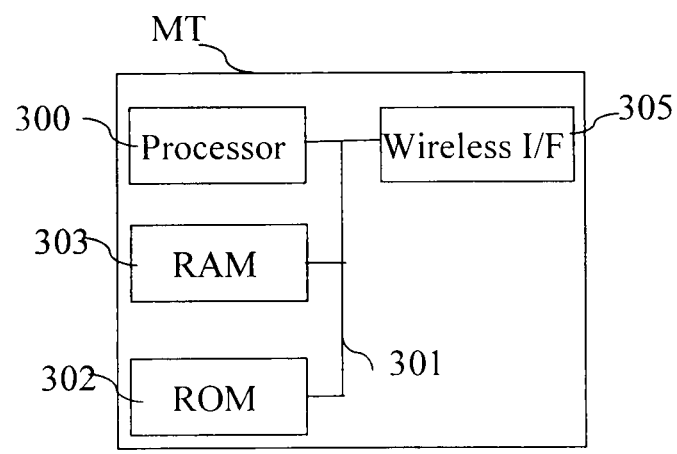
FIG. 3 is a diagram representing the architecture of a mobile terminal in which the present invention is implemented.

FIG. 3 is a diagram representing the architecture of a mobile terminal in which the present invention is implemented.

The mobile terminal MT has, for example, an architecture based on components connected together by a bus 301 and a processor 300 controlled by the program as disclosed in FIG. 8.

The bus 301 links the processor 300 to a read only memory ROM 302, a random access memory RAM 303 and a wireless interface 305.

The memory 303 contains registers intended to receive variables and the instructions of the program related to the algorithm as disclosed in FIG. 8.

The processor 300 controls the operation of the wireless interface 305.

The read only memory 302 contains instructions of the program related to the algorithm as disclosed in FIG. 8, which are transferred, when the mobile terminal MT is powered on, to the random access memory 303.

FIG. 4 discloses an example of an algorithm executed by a home base station according to a first mode of realisation of the present invention.

More precisely, the present algorithm is executed by the processor 200 of each home base station HBS.

For example, the present algorithm will be disclosed when it is executed by the processor 200 of the home base station HBS4.

At step S400, the processor 200 commands the wireless interface 205 in order to perform to a PSC sequence detection.

At the same step, the processor 300 forms a list of all detected PSC sequences. The list of all detected sequences is named hereinafter the list of appropriate sequences.

PSC sequences are comprised in the Primary Synchronisation Channel which is located at a predetermined location of a frame as it will be described in reference to FIG. 5a.

FIG. 5a discloses an example of a frame in the wireless cellular telecommunication network.

In the example of FIG. 5a, a frame is composed of 10 sub-frames. The FIG. 5a shows the last sub-frame SF10' of a previous frame and the sub-frames SF1, SF6 and SF10 of a current frame. Each sub-frame has for example a duration of one millisecond (ms).

The frequency band is for example equal to 7.68 MHz and is decomposed into 512 sub-carriers of an OFDM symbol.

The 300 sub-carriers located in the centre of the frequency band are decomposed into twenty five Physical Resource Blocks (PRB), each comprising twelve sub-carriers.

The duration of a PRB is equal to 0.5 ms. Then, two consecutive physical resource blocks PRBa and PRBb are comprised within a sub-frame duration of 1 ms.

7 consecutive OFDM symbols are comprised in each PRB.

The PSC sequence is mapped on the 72 sub-carriers or the 6 PRBs located in the centre of the frequency band and in the $7^{th}$ OFDM symbol of the first PRB noted PRBa in the time domain of the first sub-frame SF1 and of the sixth sub-frame SF6 of the current frame.

The SSC sequence is mapped on the 72 sub-carriers or the 6 PRBs located in the centre of the frequency band and in the $6^{th}$ OFDM symbol of the first PRB noted PRBa in the time domain of the first sub-frame SF1 and of the sixth sub-frame SF6 of the current frame.

At next step S401, the processor 200 checks if all the PSC sequences available in the wireless cellular telecommunication network are detected.

If all the PSC sequences available are detected, the processor 200 moves to step S404. Otherwise, the processor 200 moves to step S402.

At step S402, the processor 200 selects one PSC sequence which was not detected at step S400 and selects also a SSC sequence.

At next step S403, the processor 200 commands the wireless interface 205 in order to transfer at least a frame comprising its PCID formed by the selected PSC and SSC sequences.

After that, the processor 200 interrupts the present algorithm.

For example, the PSC sequence PSC is the PSC sequence of the home base station HBS1, the PSC sequence PSC2 is the PSC sequence of the home base station HBS2 and the PSC sequence PSC3 is the PSC sequence of the home base station HBS3.

At step S404, the processor 200 selects one PSC sequence from the list of appropriate sequences.

For example, the processor 200 selects the PSC sequence which has the less occurrence of detection among the PSC sequences detected at step S400.

As only three PSC sequences PSC1, PSC2 and PSC3 are available in the wireless cellular telecommunication network and as they are all used by neighbouring home base stations HBS1, HBS2, HBS3, the processor 200 selects for example the PSC sequence PSC2.

At next step S405, the processor 200 determines the appropriate timing for transferring at least one frame.

According to the invention, the transfer of the frame is shifted compared to the frames transferred or that may be transferred by neighbouring base stations or home base stations HBS.

As the wireless cellular telecommunication network uses a given frame structure, for example frames have a predetermined duration and are transferred successively, the processor 200 knows, from the PSC sequence detection performed in step 400, the PSC timing of a neighbouring base station or neighbouring home base station and, thus, the instant when this neighbouring base station or neighbouring home base station may start to transfer a frame.

The processor 200 delays for example the transfer of frame in order to avoid that the PSC sequence is transferred at the same time as the same PSC sequence transferred by neighbouring home base station HBS.

The processor 200 delays the transfer of frame in order to avoid that the PSC sequence PSC2 is transferred at the same time as the same PSC2 sequence transferred by neighbouring home base station HBS2.

The delay is larger than the OFDM cyclic prefix or guard period in order to enable the mobile terminals MT to identify that the two PSCs sequences come from two different home base stations HBS.

A larger delay guarantees more robustness against channels with larger delay spread and environments with larger propagation delays.

The delay may also be different from a multiple of fourteen symbols duration, i.e. one sub-frame duration. This is particularly important when home base stations HBS having the same PSC sequences have also the same SSC sequences.

The delay may be chosen as to be equal to one symbol duration in order to avoid that PSC sequences overlap each other and that SSC sequences overlap each other.

The delay may be chosen as to be equal to two symbol durations in order to avoid that PSC sequences overlap each other, that SSC sequences overlap each other and that PSC from a home base station and SSC from another home base station overlap each other.

If pilot symbols are transferred in the wireless cellular telecommunication network, the delay has to be chosen in order to avoid that pilot symbols, PSC and SSC sequences interfere or overlap each other.

FIG. 5b discloses an example of two consecutive physical resource blocks of the wireless cellular telecommunication network.

In the example of FIG. 5b, two consecutive PBRs comprising respectively the symbols S1 to S7 and S8 to S14 are shown.

The PRBs comprise the sub-carriers f1 to f12.

Pilot symbols or reference symbols are comprised in the PRBs.

The FIG. 5b is an example wherein the home base station comprises four antennas.

The pilot symbols noted R0 are pilot symbols for a first antenna of the home base station HBS which transfers the sub-frame, the pilot symbols noted R1 are pilot symbols for a second antenna of the home base station HBS which transfers the sub-frame, the pilot symbols noted R2 are pilot symbols for a third antenna of the home base station HBS which transfers the sub-frame and the pilot symbols noted R3 are pilot symbols for a fourth antenna of the home base station HBS which transfers the sub-frame.

According to the example of FIG. 5b, pilot symbols are transferred on the first, second and fifth symbols of each PRB.

According to the example of FIG. 5b, the delay has to be chosen in order to avoid that PSC and/or SSC sequences are on the first, second and fifth symbols.

At next step S406, the processor 200 commands the wireless interface 205 in order to detect all the SSC sequences used by neighbouring base stations or home base stations HBS using the same PSC sequence as the one determined for the home base station HBS4 and which transfer frames with the same delay as determined by the home base station HBS4 or with the same delay as determined by the home base station HBS4 plus an integer multiple number of sub-frame durations.

At next step S407, the processor 200 checks if all the SSC sequences available in the wireless cellular telecommunication network are detected.

If all the SSC sequences available in the wireless cellular telecommunication network are detected, the processor 200 moves to step S410. Otherwise, the processor 200 moves to step S408.

At step S408, the processor 200 selects one SSC sequence available in the wireless cellular telecommunication network which has not been detected.

At next step S409, the processor 200 commands the wireless interface 205 in order to transfer at least a frame at a timing corresponding to the determined delay. The frame comprises the PCID formed by the selected PSC and SSC sequences.

After that, the processor 200 interrupts the present algorithm.

At step S410, the processor 200 removes the PSC sequence selected at step S404 from the list of appropriate PSC sequences.

At next step S411, the processor 200 checks if the list of appropriate PSC sequences is empty, i.e. if at least one PSC sequence remains in the list of appropriate PSC sequences.

If the list of appropriate PSC is empty, the processor 200 moves to step S412.

Otherwise, the processor 200 moves to step S404 and selects another PSC sequence and executes the loop constituted by the steps S404 to S411 already described.

At step S412, the processor 200 selects one of the PSC sequences which have been received by the wireless interface 205.

For example, the processor 200 selects the PSC sequence which has been received by the wireless interface 205 with the lowest occurrence, i.e., the first selected PSC sequence with the corresponding delay determined at step S405 and the SSC sequence corresponding to the pair of PSC SSC sequences received with lowest power among the pairs containing the selected PSC sequence.

At next step S413, the processor 200 commands the wireless interface 205 in order to transfer at least a frame at a timing corresponding to the determined delay. The frame comprises the PCID formed by the selected PSC and SSC sequences.

After that, the processor 200 interrupts the present algorithm.

FIG. 6 discloses an example of an algorithm executed by a home base station according to a second mode of realisation of the present invention.

More precisely, the present algorithm is executed by the processor 200 of each home base station HBS.

For example, the present algorithm will be disclosed when it is executed by the processor 200 of the home base station HBS4.

At step S600, the processor 200 commands the wireless interface 205 in order to perform to a PSC sequence detection.

PSC sequences are comprised in the Primary Synchronisation Channel which is located at a predetermined location of a frame as described in reference to FIG. 5a.

At the same step, the processor 300 forms a list of all detected PSC sequences. The list of all detected sequence is named hereinafter the list of appropriate sequences.

At next step S601, the processor 200 checks if all the PSC sequences available in the wireless cellular telecommunication network are detected.

If all the PSC sequences available are detected, the processor 200 moves to step S604. Otherwise, the processor 200 moves to step S602.

At step S602, the processor 200 selects one available PSC sequence not detected at step S600 and selects also a SSC sequence.

At next step S603, the processor 200 commands the wireless interface 205 in order to transfer at least a frame comprising its PCID formed by the selected PSC and SSC sequences.

After that, the processor 200 interrupts the present algorithm.

For example, the PSC sequence PSC1 is the PSC sequence of the home base station HBS1, the PSC sequence PSC2 is the PSC sequence of the home base station HBS2 and the PSC sequence PSC3 is the PSC sequence of the home base station HBS3.

At step S604, the processor 200 selects one PSC sequence in the list of appropriate sequences.

For example, the processor 200 selects the PSC sequence which has the less occurrence of detection among the PSC sequences detected at step S600.

As only three PSC sequences PSC1, PSC2 and PSC3 are available in the wireless cellular telecommunication network and as they are all used by neighbouring home base stations HBS1, HBS2, HBS3, the processor 200 selects for example the PSC sequence PSC2.

At next step S605, the processor 200 determines plural appropriate timings for transferring at least one frame. Each determined timing corresponds to the conditions disclosed at step S405 of FIG. 4. The appropriate timings are stored in a list of appropriate timings.

At the same step, the processor 200 selects one of the determined timing in the list of appropriate timings.

At next step S606, the processor 200 commands the wireless interface 205 in order to detect all the SSC sequences used by neighbouring home base stations HBS using the same SSC sequence as the home base station HBS4 and which transfer frames with a same delay as determined by the home base station HBS4 or with the same delay as determined by the home base station HBS4 plus an integer multiple number of sub-frame durations.

At next step S607, the processor 200 checks if all the SSC sequences available in the wireless cellular telecommunication network have been detected at step S606.

If all the SSC sequences available have been detected, the processor 200 moves to step S610. Otherwise, the processor 200 moves to step S608.

At step S608, the processor 200 selects one SSC sequence which has not been detected at step S606.

At next step S609, the processor 200 commands the wireless interface 205 in order to transfer at least a frame at a timing corresponding to the determined delay. The frame comprises the PCID formed by the selected PSC and SSC sequences.

After that, the processor 200 interrupts the present algorithm.

At step S610, the processor 200 removes the selected timing from the list of appropriate timings.

At next step S611, the processor 200 checks if the list of appropriate timings is empty, i.e. if at least one appropriate timing remains in the list of appropriate timings.

If the list of appropriate timings is empty, the processor 200 moves to step S612. Otherwise, the processor 200 moves to step S615.

At step S615, the processor 200 selects another appropriate timing in the list of appropriate timing and returns to step S606 already described.

At step S612, the processor 200 removes the PSC sequence selected at step S604 from the list of appropriate PSC sequences.

At next step S613, the processor 200 checks if the list of appropriate PSC sequences is empty, i.e. if at least one PSC sequence remains in the list of appropriate PSC sequences.

If the list of appropriate PSC sequences is empty, the processor 200 moves to step S614.

Otherwise, the processor 200 moves to step S604 and selects another PSC sequence.

At step S614, the processor 200 selects one of the PSC sequences which have been received by the wireless interface 205.

For example, the processor 200 selects the PSC sequence which has been received with less occurrence, i.e., the first selected PSC sequence with the corresponding first selected appropriate timing and the SSC sequence corresponding to the pair received with lowest power among the pairs containing the selected PSC sequence.

At the same step, the processor 200 commands the wireless interface 205 in order to transfer at least a frame at a timing corresponding to the determined delay. The frame comprises the PCID formed by the selected PSC and SSC sequences.

After that, the processor 200 interrupts the present algorithm.

FIG. 7 discloses an example of an algorithm executed by a home base station according to a third mode of realisation of the present invention.

More precisely, the present algorithm is executed by the processor 200 of each home base station HBS.

For example, the present algorithm will be disclosed when it is executed by the processor 200 of the home base station HBS4.

At step S700, the processor 200 commands the wireless interface 205 in order to perform to a PCID detection, i.e., a detection of pairs of PSC and SSC sequences.

At next step S701, the processor 200 checks if all the PCID sequences available in the wireless cellular telecommunication network are detected.

If all the PCID sequences available are detected, the processor 200 moves to step S703. Otherwise, the processor 200 moves to step S702.

At step S702, the processor 200 selects one PCID sequences which has not been detected at step S700 and commands the wireless interface 205 in order to transfer at least a frame comprising the selected PCID sequence.

After that, the processor 200 interrupts the present algorithm.

At step S703, the processor 200 forms a list of appropriate PSC sequences which comprises the PSC sequences which have been detected at step S700, i.e. all the PCS sequences available in the wireless cellular telecommunication network.

At next step S704, the processor 200 selects one detected PSC sequence in the list of appropriate PSC sequences.

For example, the processor 200 selects the PSC sequence which has the less occurrence of detection among the PSC sequences detected at step S700.

At next step S705, the processor 200 determines plural appropriate timings for transferring at least one frame. Each determined timing corresponds to the conditions disclosed at step S405 of FIG. 4. The appropriate timings are stored in a list of appropriate timings.

At the same step, the processor 200 selects one of the determined appropriate timings in the list of appropriate timings.

At next step S706, the processor 200 commands the wireless interface 205 in order to detect all the SSC sequences used by neighbouring home base stations HBS using the same PSC sequence as the home base station HBS4 and which transfer frames with a same delay as determined by the home base station HBS4 or with the same delay as determined by the home base station HBS4 plus an integer multiple number of sub-frame durations.

At next step S707, the processor 200 checks if all the SSC sequences available in the wireless cellular telecommunication network are detected at step S706.

If all the SSC sequences available are detected, the processor 200 moves to step S710. Otherwise, the processor 200 moves to step S708.

At step S708, the processor 200 selects one SSC sequence which has not been detected at step S706.

At next step S709, the processor 200 commands the wireless interface 205 in order to transfer at least a frame at a timing corresponding to the determined delay. The frame comprises the PCID formed by the selected PSC and SSC sequences.

After that, the processor 200 interrupts the present algorithm.

At step S710, the processor 200 removes the selected timing from the list of appropriate timings.

At next step S711, the processor 200 checks if the list of appropriate timings is empty, i.e. if at least one appropriate timing remains in the list of appropriate timings.

If the list of appropriate timings is empty, the processor 200 moves to step S712. Otherwise, the processor 200 moves to step S715.

At step S715, the processor 200 selects another appropriate timing in the list of appropriate timing and returns to step S706 already described.

At step S712, the processor 200 removes the PSC sequence selected at step S704 from the list of appropriate PSC sequences.

At next step S713, the processor 200 checks if the list of appropriate PSC sequences is empty, i.e. if at least one PSC sequence remains in the list of appropriate PSC sequences.

If the list of appropriate PSC sequences is empty, the processor 200 moves to step S714.

Otherwise, the processor 200 moves to step S704 and selects another PSC sequence.

At step S714, the processor 200 selects one of the PSC sequences which have been received by the wireless interface 205.

For example, the processor 200 selects the PSC sequence with less occurrence, i.e., the first selected PSC sequence with corresponding first selected timing and the SSC sequence corresponding to the pair received with lowest power among the pairs containing the selected PSC sequence.

At the same step, the processor 200 commands the wireless interface 205 in order to transfer at least a frame at a timing corresponding to the determined delay. The frame comprises the PCID formed by the selected PSC and SSC sequences.

After that, the processor 200 interrupts the present algorithm.

FIG. 8 discloses an example of an algorithm executed by a mobile terminal according to the present invention.

More precisely, the present algorithm is executed by the processor 300 of each mobile terminal MT.

The present algorithm will be disclosed when it is executed by the processor 300 of the mobile terminal MT1.

At step S800, the processor 300 commands the wireless interface 305 in order to perform to a PSC sequence detection.

As the mobile terminal MT1 is located in the cells C1, C2, C3 and C4, the wireless interface 305 detects the reception of the PSC sequences PSC1, PSC2 and PSC3.

At next step S801, the processor 300 checks if one same PSC sequence has been detected two times by the wireless interface 305.

If no PSC sequence has been detected two times by the wireless interface 305, the processor 300 interrupts the present algorithm.

If the same PSC sequence has been detected two times by the wireless interface 305, the processor 300 moves to step S802.

It has to be noted here that in case of multiple paths, plural correlation peaks may be detected for a unique transfer of a PSC sequence.

The mobile terminal MT1 detects two receptions of the PSC sequence PSC2.

At step S802, the processor 300 checks if the difference of the detection time between the first peak and the last peak for the PSC sequence is lower than a guard period separating two symbols.

The guard time is predetermined and known by the mobile terminal MT1.

If the difference of the detection time of the PSC sequence is lower than the guard period separating two symbols, the processor 300 moves to step S803.

If the difference of the detection time of the PSC sequence is equal or upper than guard period separating two symbols, the processor 300 moves to step S804.

At step S803, the processor 300 determines that the PSC sequence received two times has been transferred by the same home base station HBS.

After that, the processor 300 interrupts the present algorithm.

At step S804, the processor 300 determines that the PSC sequence received two times has been transferred by two different home base stations HBS.

The mobile terminal MT1 is then able to differentiate the PSC sequence PC2 transferred by the home base station HBS2 and the PSC sequence PC2 transferred by the home base station HBS4.

After that, the processor 300 interrupts the present algorithm.

Naturally, many modifications can be made to the embodiments of the invention described above without departing from the scope of the present invention.

The invention claimed is:

1. A method for transferring, in a wireless cellular telecommunication network, a sequence enabling identification of a home base station, by a mobile terminal located in a cell of the home base station, symbols transferred between the home base station and the mobile terminal being separated by a guard period, the method, performed by the home base station, comprising:

receiving, at the home base station, from neighbouring base stations or neighbouring home base stations, sequences enabling the identification of said neighbouring base stations or said neighbouring home base stations;

selecting one received sequence enabling the identification of one neighbouring base station or one neighbouring home base station upon determination that all available sequences for the wireless network have been received by the home base station; and shifting a start of a transfer of a frame of symbols in the cell of the home base station from a start of a reception of a frame of symbols transferred by said one neighbouring base station or said one neighbouring home base station which is identified with the selected received sequence by a time duration which is equal to or greater than the guard period, the frame of symbols in the cell of the home base station including the selected sequence enabling the identification of said one neighbouring base station or said one neighbouring home base station.

2. The method according to claim 1, wherein each sequence enabling the identification of said one neighbouring base station or said one neighbouring home base station is a combination of first and second sequences included in frames, each frame being composed of sub-frames and the selected received sequence is the first sequence and the method further comprises the step of:

detecting each second sequence identifying said one neighbouring base station or said one neighbouring home base station identified with the selected received sequence and which transfers a frame of symbols which starts to be received at the same time or at a multiple number of sub-frame durations from the start of the transfer of a frame of symbols by the home base station.

3. The method according to claim 2, wherein the method further comprises:

selecting one non detected second sequence upon determination that all available second sequences for the wireless network have not been received by the home base station; and selecting another first received sequence if each second sequence in the wireless cellular telecommunication network is detected.

4. The method according to claim 3, wherein the method further comprises:

determining plural time durations for shifting the start of the transfer of a frame of symbols in the cell of the home base station and another first received sequence is selected if, for each time duration, each second sequence in the wireless cellular telecommunication network is detected.

5. The method according to claim 1, wherein the method further comprises:

checking if there is at least one sequence enabling the identification of one base station or home base station in the wireless cellular telecommunication network which is not detected;

selecting one non detected sequence enabling the identification of one base station or home base station if there is at least one sequence enabling the identification of one base station or home base station in the wireless cellular telecommunication network which is not detected; and starting transfer of the frame of symbols in the cell of the home base station at the start of the reception of a frame of symbols transferred by said one neighbouring base station or said one neighbouring home base station.

6. The method according to claim 1, wherein the time duration is different from a sub-frame duration or a multiple number of sub-frame durations.

7. The method according to claim 6, wherein the time duration is a symbol duration or a multiple number of symbol durations or a guard period duration or a multiple number of guard period durations.

8. The method according to claim 7, wherein pilot symbols are transferred in sub-frames and the time duration is determined to avoid that the first and second sequences overlap pilot symbols transferred by said one neighbouring home base station or said one neighbouring base station or overlap the first or second sequence transferred by said one neighbouring home base station or said one neighbouring base station or to avoid that pilot symbols transferred by the home base station overlap pilot symbols transferred by said one neighbouring home base station or said one neighbouring base station or overlap first or second sequence transferred by said one neighbouring home base station or said one neighbouring base station.

9. A method for determining, by a mobile terminal located in a cell of a base station or home base station in a wireless cellular telecommunication network, when one or more home base stations and/or one or more base stations transfer a sequence enabling the identification of the one or more base stations and/or the one or more home base stations, the mobile terminal being located in a cell of base station or home base station, the symbols transferred between the mobile terminal and the base station or home base station being separated by a guard period, the method, performed by the mobile terminal, comprising:

detecting, twice at the mobile terminal, a sequence enabling the identification of a first base station or a first home base station;

checking if a time duration separating the two receptions of the sequence is larger than the guard period;

determining that the first base station and a second base station or the first home base station and a second home base station or the first base station and a second home base station or the first home base station and a second base station are identified by the received sequence if the time duration separating the two receptions of the sequence is larger than the guard period; and determining that only the first base station or only the first home base station is identified by the received sequence if the time duration separating the two receptions of the sequence is lower than the guard period.

10. A device for transferring, in a wireless cellular telecommunication network, a sequence enabling identification of a home base station by a mobile terminal located in the cell of the home base station, symbols transferred between the home base station and the mobile terminal being separated by a guard period, the device being included in the home base station and comprising:

means for receiving from neighbouring base stations or neighbouring home base stations sequences enabling the identification of neighbouring base stations or neighbouring home base stations;

means for selecting one received sequence enabling the identification of one neighbouring base station or one neighbouring home base station; and means for shifting a start of a transfer of a frame of symbols in the cell of the home base station from a start of a reception of a frame of symbols transferred by said one neighbouring base station or said one neighbouring home base station identified with the selected received sequence by a time duration which is equal to or greater than the guard period, the frame of symbols in the cell of the home base station including the selected sequence enabling the identification of said one neighbouring base station or said one neighbouring home base station.

11. A device included in a mobile terminal located in a cell of a base station or a home base station for determining, in a wireless cellular telecommunication network, when one or more home base stations and/or one or more base stations transfer a sequence enabling the identification of the one or more base stations and/or the one or more home base stations, symbols transferred between the mobile terminal and the base station or home base station being separated by a guard period, the device comprises:

means for detecting, twice at the mobile terminal, a sequence enabling the identification of a first base station or a first home base station;

means for checking if a time duration separating the two receptions of the sequence is larger than the guard period;

means for determining that the first base station and a second base station or the first home base station and a second home base station or the first base station and a second home base station or the first home base station and a second base station are identified by the received sequence if the time duration separating the two receptions of the sequence is larger than the guard period; and means for determining that only the first base station or only the first home base station is identified by the received sequence if the time duration separating the two receptions of the sequence is lower than the guard period.

12. A non-transitory computer readable storage medium having executable instructions stored therein, which when executed by a processor in a home base station causes the processor to execute a method comprising:

receiving, at the home base station, from neighbouring base stations or neighbouring home base stations sequences enabling the identification of said neighbouring base stations or said neighbouring home base stations;

selecting one received sequence enabling the identification of one neighbouring base station or one neighbouring home base station upon determination that all available sequences for the wireless network have been received by the home base station; and shifting a start of a transfer of a frame of symbols in the cell of the home base station from a start of a reception of a frame of symbols transferred by said one neighbouring base station or said one neighbouring home base station which is identified with the selected received sequence by a time duration which is equal to the guard period, the frame of symbols in the cell of the home base station including the selected sequence enabling the identification of said one neighbouring base station or said one neighbouring home base station.

13. A non-transitory computer readable storage medium having executable instructions stored therein, which when executed by a processor in a mobile terminal causes the processor to execute a method comprising:
- detecting, twice at the mobile terminal, a sequence enabling the identification of a first base station or a first home base station;
- checking if a time duration separating the two receptions of the sequence is larger than the guard period;
- determining that the first base station and a second base station or the first home base station and a second home base station or the first base station and a second home base station or the first home base station and a second base station are identified by the received sequence if the time duration separating the two receptions of the sequence is larger than the guard period; and
- determining that only the first base station or only the first home base station is identified by the received sequence if the time duration separating the two receptions of the sequence is lower than the guard period.

* * * * *

UNITED STATES PATENT AND TRADEMARK OFFICE
CERTIFICATE OF CORRECTION

| | | |
|---|---|---|
| PATENT NO. | : 8,498,283 B2 | Page 1 of 1 |
| APPLICATION NO. | : 12/844458 | |
| DATED | : July 30, 2013 | |
| INVENTOR(S) | : Loic Brunel et al. | |

It is certified that error appears in the above-identified patent and that said Letters Patent is hereby corrected as shown below:

On the title page, Item (54) and in the specification, column 1, the title is incorrect. Item (54) and column 1 should read:

--METHOD FOR TRANSFERRING A
SEQUENCE ENABLING THE
IDENTIFICATION OF THE HOME BASE
STATION BY A MOBILE TERMINAL FOR
AVOIDING THE USE OF SAME PSC/PCID
SEQUENCE BY HOME BASE STATIONS--

Signed and Sealed this
Seventeenth Day of September, 2013

Teresa Stanek Rea
*Deputy Director of the United States Patent and Trademark Office*